United States Patent
Wright

(10) Patent No.: US 6,999,063 B1
(45) Date of Patent: *Feb. 14, 2006

(54) METHOD AND APPARATUS FOR ACCURATELY READING A POTENTIOMETER

(75) Inventor: David G. Wright, Woodinville, WA (US)

(73) Assignee: Cypress Semiconductor Corp., San Jose, CA (US)

( * ) Notice: Subject to any disclaimer, the term of this patent is extended or adjusted under 35 U.S.C. 154(b) by 342 days.

This patent is subject to a terminal disclaimer.

(21) Appl. No.: 10/430,991

(22) Filed: May 7, 2003

Related U.S. Application Data

(63) Continuation of application No. 09/821,680, filed on Mar. 29, 2001, now Pat. No. 6,577,297.

(51) Int. Cl.
*G00G 5/08* (2006.01)
(52) U.S. Cl. .................. 345/161; 345/156
(58) Field of Classification Search ........ 345/156–157, 345/161–169; 341/20–22
See application file for complete search history.

(56) References Cited

U.S. PATENT DOCUMENTS

| | | | |
|---|---|---|---|
| 4,563,676 A | 1/1986 | Leininger | 345/472 |
| 4,987,372 A | 1/1991 | Ofori-Tenkorang et al. | 324/705 |
| 6,078,311 A | 6/2000 | Pelkey | 345/161 |
| 6,175,359 B1 | 1/2001 | Marten | 345/161 |
| 6,429,850 B1 | 8/2002 | Marten | 345/161 |
| 6,577,297 B1 * | 6/2003 | Wright | 345/161 |

* cited by examiner

*Primary Examiner*—Xiao Wu
(74) *Attorney, Agent, or Firm*—Christopher P. Maiorana, PC

(57) ABSTRACT

A method for reading a position of a wiper on a potentiometer, comprising the steps of (A) charging a capacitor connected to a wiper terminal of the potentiometer, (B) discharging the capacitor through a particular terminal of the potentiometer, (C) measuring a first time taken to discharge the capacitor from a first voltage to a second voltage, (D) recharging the capacitor, (E) discharging the capacitor through another particular terminal of the potentiometer, (F) measuring a second time taken to discharge the capacitor from the first voltage to the second voltage, (G) reading the position of the wiper by calculating a ratio of the times measured in steps (C) and (F).

20 Claims, 2 Drawing Sheets

METHOD AND APPARATUS FOR ACCURATELY READING A POTENTIOMETER

This is a continuation of U.S. Ser. No. 09/821,680, filed Mar. 29, 2001 now U.S. Pat. No. 6,577,297.

FIELD OF THE INVENTION

The present invention relates to a method and/or architecture for reading a potentiometer generally and, more particularly, to a method and/or architecture for accurately reading a potentiometer with a microprocessor.

BACKGROUND OF THE INVENTION

Conventional low cost Universal Serial Bus (USB) joysticks are inaccurate. Such inaccuracy is not acceptable for the end user. Improved accuracy of conventional USB joysticks require numerous (and costly) external components.

In particular, conventional low cost solutions for reading a potentiometer rely on RC discharge timing. Such approaches are inherently inaccurate due to potentiometer errors when operating in 2-terminal mode. Readings obtained from the potentiometers operated in this mode vary with supply voltage and are subject to noise, drift and temperature variation. Thus, the readings have limited accuracy and this inaccuracy manifests itself as crosshair jitter and drifting of the joystick center position. Another source of error in the conventional approach occurs due to microprocessor measurements of the RC (charge or discharge time).

In one version of the conventional approach, the period of time to charge a capacitor through the variable resistor from 0V to an input logic level threshold of the microcontroller CMOS input is measured. Such an approach introduces additional inaccuracy. Inaccuracy is introduced when measuring the time interval. Also, inaccuracy arises from variations in the level of the voltage source used to charge the capacitor through the variable resistor.

It would be desirable to provide a method and/or apparatus for accurately reading a potentiometer that adds a minimal cost to the circuit.

SUMMARY OF THE INVENTION

The present invention concerns a method for reading a position of a wiper on a potentiometer, comprising the steps of (A) charging a capacitor connected to a wiper terminal of the potentiometer, (B) discharging the capacitor through a particular terminal of the potentiometer, (C) measuring a first time taken to discharge the capacitor from a first voltage to a second voltage, (D) recharging the capacitor, (E) discharging the capacitor through another particular terminal of the potentiometer, (F) measuring a second time taken to discharge the capacitor from the first voltage to the second voltage, (G) reading the position of the wiper by calculating a ratio of the times measured in steps (C) and (F).

The objects, features and advantages of the present invention include providing a method and/or architecture for accurately reading a potentiometer that may (i) be cost-effective; (ii) use a microcontroller I/O cell with two input logic level thresholds to measure a time period for a changing input voltage to move from one threshold to another threshold in order to obtain a reading; and/or (iii) use any digital logic input having two thresholds to obtain a reading.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
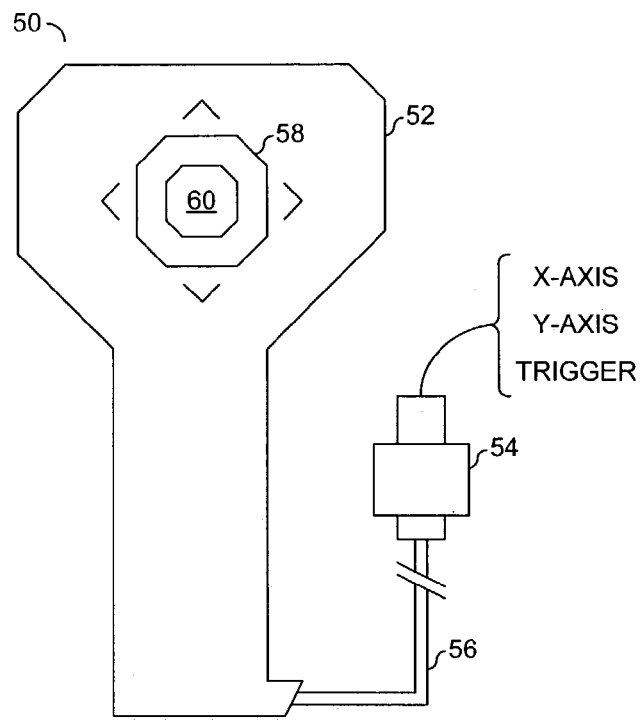
FIG. 1 is a diagram of an implementation of the present invention.

Referring to FIG. 1, a block diagram of a device (or system) 50 is shown in accordance with an implementation of the present invention. The system 50 may be implemented as a Universal Serial Bus (USB) joystick device. The device 50 generally comprises a base portion 52 and a connector portion 54. The base portion 52 and the connector portion 54 may be connected by a cord 56. In one example, the connector portion 54 may be implemented as a USB connector and the cord 56 may be implemented as a USB cord. However, a particular type of the connector portion 54 and the cord 56 may be varied in order to meet the criteria of a particular implementation. The base portion 52 may have a joystick handle 58. The joystick handle 58 may provide motion on a first axis (e.g., X-AXIS) and a second axis (e.g., Y-AXIS). The joystick handle 58 may also have a button 60 that may generate a signal (e.g., TRIGGER). The signals X-AXIS, Y-AXIS and TRIGGER may be communicated to a host device (not shown) through the connector portion 54. The particular number of controls or buttons of the joystick handle 58 and/or the base 52 may be varied.

The present invention may be used to read potentiometer values, such as from a USB joystick (e.g., the joystick system 50) or other type of joystick. A position calculation of the joystick handle 58 may be calculated by measuring the time taken for a voltage across a capacitor to fall from a first threshold (e.g., CMOS input threshold) to a second threshold (e.g., a TTL input threshold to be discussed in detail in connection with FIG. 2). However, other input thresholds may be implemented accordingly to meet the design criteria of a particular implementation. Furthermore, the capacitor may be discharged through the joystick potentiometer.

A precision position calculation of the joystick handle 58 may be determined by measuring the ratio of (i) a period of time for the capacitor to be discharged though the potentiometer from a wiper to the first end of the potentiometer to (ii) the time taken for the capacitor to be discharged though the potentiometer from the wiper to the second end of the potentiometer. Furthermore, the present invention may allow precision calculation of a position of a wiper on a potentiometer in any application.

Figure 2:
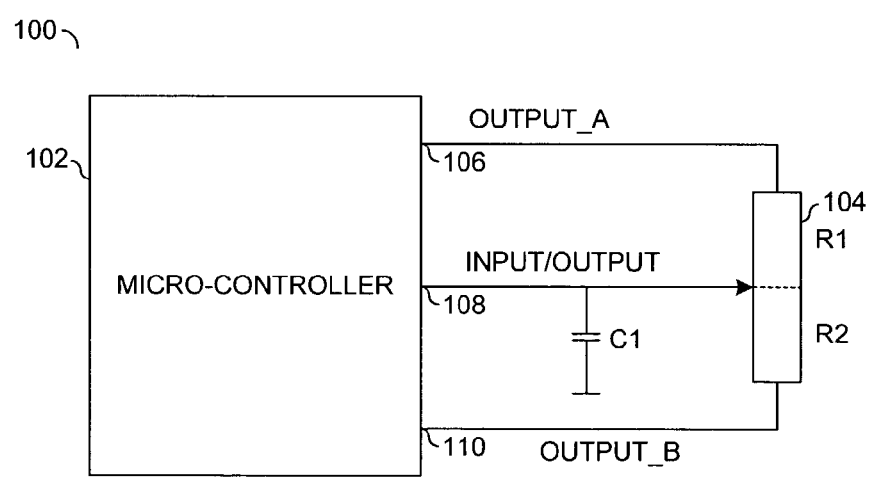
FIG. 2 is a block diagram of a preferred embodiment of the present invention.

Referring to FIG. 2, a block diagram of a circuit (or system) 100 is shown in accordance with a preferred embodiment of the present invention. In one example, the circuit 100 may be implemented within the joystick device 50. The system 100 generally comprises a circuit 102 and an input device 104. The circuit 102 may be implemented as a microcontroller. The input device 104 may be a potentiometer, such as a potentiometer in a joystick or other input device. In one example, the microcontroller 102 may be a Universal Serial Bus (USB) microcontroller. The microcontroller 102 may have an output 106 that may present a signal (e.g., OUTPUT_A), an output 108 that may present a signal (e.g., OUTPUT_B) and an input/output 110 that may present/receive a signal (e.g., INPUT/OUTPUT). A capacitor (e.g., C1) may be connected between the signal INPUT/OUTPUT and ground. The circuit 100 may allow the capacitor C1 to be implemented as a non-precision capacitor. Each of the signals of the present invention may be implemented as a voltage, a voltage on a node, a node, or other appropriate type signal. The device 104 may be implemented as a variable resistance potentiometer. The device 104 may comprise a first resistance (e.g., R1) and a second resistance (e.g., R2).

The system 100 may allow precision USB joysticks to be implemented using a microcontroller (e.g., the microcontroller 102) that do not incorporate on-board analog to digital converters (ADCs). Moreover, the system 100 may not require additional external components as discussed in the background section. The system 100 may be suitable for any application that requires a potentiometer to be read by a microcontroller. Furthermore, the circuit 100 may provide a scheme for using a low-cost USB microcontroller to accurately measure the position of a wiper on the potentiometer 104 using the non-precision capacitor C1.

Figure 3:
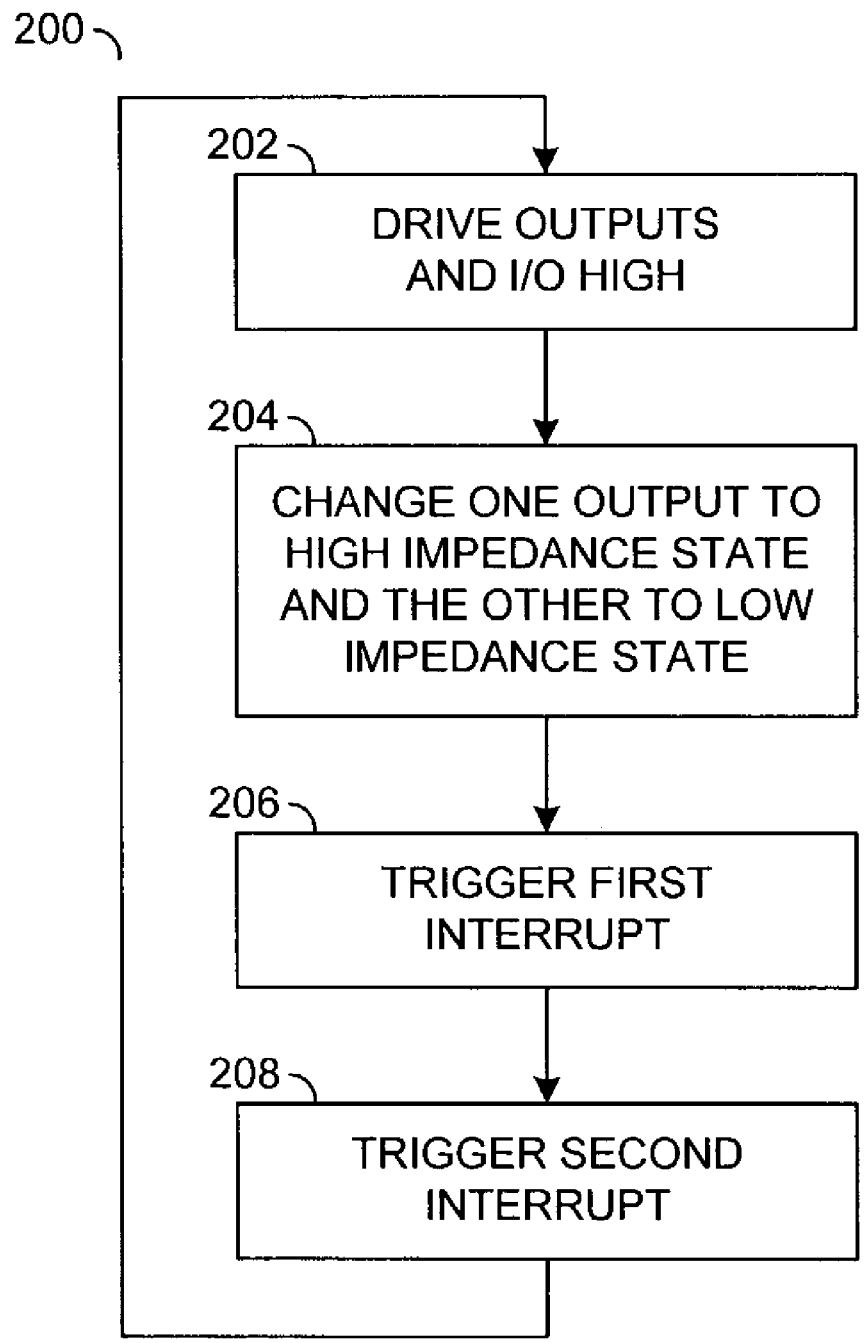
FIG. 3 is a flow chart illustrating an operation of the present invention.

Referring to FIG. 3, a method (or process) 200 is shown in accordance with the present invention. In one example, instructions for executing the process 200 may be stored in the microcontroller 102. The process 200 generally comprises a state 202, a state 204, a state 206, and a state 208. The state 202 may drive the signal OUTPUT_A, the signal OUTPUT_B and the signal INPUT/OUTPUT to a digital high. Next, the state 204 may change a first output (e.g., the signal OUTPUT_B) to a high impedance state and a second output (e.g., the signal OUTPUT_A) to a high current sinking state. Next, the state 206 may continue a timer value when a first interrupt is triggered. The first interrupt may be triggered when the voltage on the node input/output falls below a first threshold. A timer snapshot value may also be captured. Then the state 208 may continue when a second interrupt is triggered. The second interrupt may be triggered when the node input/output falls below a second threshold voltage. A timer snapshot value may also be captured. The first and second interrupts may allow the microcontroller 102 to record resistive valves of the resistors R1 and R2.

At the state 202, both the outputs nodes OUTPUT_A and OUTPUT_B and the INPUT/OUTPUT may be driven high for a period sufficient to ensure the capacitor C1 is fully charged. At the states 206 and 208, the node INPUT/OUTPUT may be configured to capture a snapshot of the value of an internal free-running timer on a HI-LO transition at CMOS logic thresholds. The capture event may then cause an interrupt. At the state 204, the node OUTPUT_B may then be changed to a high impedance state and the node OUTPUT_A set to a high current sinking mode. At the state 206, when the timer capture interrupt is triggered, a first timer value is captured and the input threshold set to the lower TTL logic threshold. At the state 208, when the second capture interrupt is triggered, a second timer value is captured. The difference between the captured timer values may be determined and the elapsed time calculated. The process 200 is generally then repeated except that the node OUTPUT_A may be set at a high impedance and the node OUTPUT_B set at a sinking current. The ratio of the resistors R1/R1 are precisely the ratio of the 2 timed periods.

The process 200 generally requires the microcontroller 102 to receive two different input logic level thresholds. The logic level thresholds may be dynamically selected in firmware. The thresholds may be a TTL-compatible threshold (e.g., 0.8V, etc.) and a CMOS-compatible threshold (e.g., 2.5V, etc.). However, the thresholds may be trimmed using on-board registers (within the microcontroller 102) to set other desired threshold values with significant precision.

The system 100 may implement the potentiometer 104 as two separate resistors R1 and R2. The particular resistance of the resistors R1 and R2 may vary, but the combined resistance generally remains constant. The ratio of the resistor R1 and R2 may be a direct measure of the position of the joystick handle 58. The potentiometer 104 (R1 and R2) may be connected to the microcontroller 102. In one example, the node OUTPUT_A may be coupled to the resistor R1 and the node OUTPUT_B may be coupled to the resistor R2. The outputs 106 and 110 of the microcontroller 102 may need to be tristated (e.g., a high impedance state) when not used.

The ratio of the resistors R1/R2 is generally determined as follows:
  (i) drive the nodes OUTPUT_A, OUTPUT_B and INPUT/OUTPUT "high" for a period sufficient to ensure that the capacitor C1 is fully charged;
  (ii) the node OUTPUT_B may then be changed to a high impedance state, the node OUTPUT_A may be set to a high current sinking state;
  (iii) the node INPUT/OUTPUT may then capture a snapshot value of an internal free-running timer on a HI-LO transition at CMOS logic thresholds, and cause an interrupt;
  (iv) when the timer capture interrupt is triggered, a first timer value may be captured, and the input threshold set to the lower TTL logic threshold;
  (v) when a second capture interrupt is triggered, a second timer value may be captured. The difference between the captured timer values may be determined and the elapsed time calculated;
  (vi) the process is generally then repeated except that the node OUTPUT_A is at a high impedance state and the node OUTPUT_B is set at a sinking current state; and
  (vii) the ratio of the resistors R1/R1 may be precisely the ratio of the 2 timed periods.

There is little allowance for variability in interrupt latency since latency may increase error. The circuit 100 may therefore implement "capture timers" that automatically capture, the timer snapshot on the external HI-LO transition to minimize timing errors. The precision of readings taken using the circuit 100 for any given available measurement of time may be increased by limiting the voltage across the capacitor C1 to a slightly higher level than the CMOS threshold. For example, a zener diode may be implemented. The circuit 100 may allow multiple joystick axis to be read using a single capture timer input by connecting multiple potentiometer wipers to a single input, each having separate OUTPUT_A and OUTPUT_B pins, and measuring each potentiometer in turn. Such an implementation may allow 10–20 100 kΩ potentiometers may be measured in sequence. Alternatively, by connecting multiple potentiometers to the same OUTPUT_A and OUTPUT_B pins, to separate capacitors and "capture timer" inputs, multiple potentiometers may be measured simultaneously.

Conventional pre-USB joysticks often had little electronic content, other than potentiometers and switches. The circuit 100 may provide a cost-effective USB joystick device. The circuit 100 may implement a microcontroller I/O cell with 2 input logic level thresholds to measure a period of time for a changing an input voltage from one threshold to another. Moreover, the circuit 100 may compare periods of time of the charging voltages to read a potentiometer.

The circuit 100 may implement any digital logic input having more than one threshold voltage. The circuit 100 may implement dynamically programmable logic input thresholds to measure capacitor discharge time. The circuit 100 may then use of a pair of such time measurements when discharging the capacitor though alternate ends of a potentiometer to precisely determine the position of the potentiometer wiper. The position of the potentiometer wiper may precisely determine the position of a joystick handle. Thus, the circuit 100 may allow joystick manufacturers to offer a precision joystick for the cost of a solution typically regarded as being inadequate other than in the lowest quality joysticks.

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) accordingly to meet the design criteria of a particular implementation.

The function performed by the flow diagram of FIG. 3 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

What is claimed is:

1. A method for reading a position of a wiper on a potentiometer, comprising the steps of:
   (A) charging a capacitor connected to a wiper terminal of said potentiometer;
   (B) discharging the capacitor through a particular terminal of the potentiometer;
   (C) measuring a first time taken to discharge the capacitor from a first voltage to a second voltage;
   (D) re-charging the capacitor;
   (E) discharging the capacitor through another particular terminal of the potentiometer;
   (F) measuring a second time taken to discharge the capacitor from said first voltage to said second voltage; and
   (G) reading the position of the wiper by calculating a ratio of the times measured in steps (C) and (F).

2. The method according to claim 1, wherein said first voltage comprises a CMOS input threshold.

3. The method according to claim 1, wherein said second voltage threshold comprises a TTL input.

4. The method according to claim 1, wherein:
   step (C) further comprises measuring a first discharge time for said capacitor to be discharged by said wiper through a first end of said potentiometer; and
   step (E) further comprises measuring a second discharge time for said capacitor to be discharged by said wiper through a second end of said potentiometer.

5. The method according to claim 1, wherein said first and second voltage are programmed in firmware.

6. The method according to claim 1, wherein said first and second voltage are trimmed in response to registers.

7. The method according to claim 1, wherein:
   step (C) further comprises using a dynamically programmable logic input threshold to measure said first time; and
   step (E) further comprises using said dynamically programmable logic input threshold to measure said second time.

8. The method according to claim 1, wherein steps (C) and (E) further include:
   using a pair of time measurements when discharging though alternate ends of said potentiometer to determine the position of the wiper.

9. The method according to claim 1, wherein step (H) further comprises:
   using a position of the wiper to precisely determine a position of a joystick handle.

10. A method for reading a position of a wiper on a potentiometer, comprising the steps of:
    (A) receiving a first and a second input thresholds;
    (B) charging a capacitor connected to a wiper terminal of said wiper to said first input threshold or said second input threshold;
    (B) measuring a first time for said capacitor to discharge through a first particular end of said potentiometer;
    (C) re-charging said capacitor;
    (D) measuring a second time for said capacitor to discharge through a second particular end of said potentiometer; and
    (E) calculating said position of said wiper in response to said first and second times.

11. The method according to claim 10, wherein step (E) further comprises:
    determining a first and second resistance, to precisely determine a position of a joystick handle.

12. An apparatus comprising:
    a microcontroller configured to read a position of a wiper on a potentiometer, wherein said microcontroller is configured to receive a first and second voltage, charge a capacitor connected to a wiper terminal of said potentiometer, discharge the capacitor through a first terminal of said potentiometer, measure a first time to discharge the capacitor from said first voltage to said second voltage, re-charge said capacitor, discharge the capacitor through a second terminal of said potentiometer, measure a second time to discharge the capacitor from the first voltage to the second voltage, and read the position of said wiper by calculating a ratio, wherein said ratio is calculated in response to said first and second times.

13. The apparatus according to claim 12, wherein said first voltage comprises a CMOS input threshold and said second voltage threshold comprises a TTL input threshold.

14. The apparatus according to claim 12, wherein said microcontroller is further configured to measure a first discharge time for said capacitor by said wiper through a first end of said potentiometer and a second discharge time for said capacitor to be discharged by said wiper through a second end of said potentiometer.

15. The apparatus according to claim 12, wherein said first and second voltages are programmed in firmware.

16. The apparatus according to claim 12, wherein said first and second voltages are trimmed in response to registers.

17. The apparatus according to claim 12, wherein said microcontroller is further configured to use dynamically programmable logic input thresholds to measure said first and second times.

18. The apparatus according to claim 12, wherein said microcontroller further implements a pair of time measurements when discharging though alternate ends of said potentiometer to determine the position of the wiper.

19. The apparatus according to claim 12, wherein said microcontroller is further configured to implement a position of the wiper to precisely determine a position of a joystick handle.

20. The apparatus according to claim 12, wherein said microcontroller is configured to accurately read said potentiometer.

* * * * *